United States Patent [19]

Cooley

[11] Patent Number: 4,746,430

[45] Date of Patent: May 24, 1988

[54] FLUID SEPARATION MODULE

[75] Inventor: Thomas E. Cooley, Houston, Tex.

[73] Assignee: W. R. Grace & Co., New York, N.Y.

[21] Appl. No.: 786,757

[22] Filed: Oct. 11, 1985

[51] Int. Cl.[4] .................... B01D 13/00; B01D 53/22

[52] U.S. Cl. ........................... 210/321.85; 210/232; 210/321.76; 210/321.87; 210/450; 55/158

[58] Field of Search ............. 210/321.1, 321.5, 500.23, 210/433.2, 450, 497.1, 232, 321.76, 321.85, 321.87; 55/158

[56] References Cited

U.S. PATENT DOCUMENTS

| | | | |
|---|---|---|---|
| 3,272,337 | 9/1966 | Elwell | 210/136 |
| 3,290,286 | 12/1966 | Kesting | 260/230 |
| 3,300,050 | 1/1967 | Perry | 210/234 |
| 3,327,858 | 6/1967 | Eddy et al. | 210/234 |
| 3,367,504 | 2/1968 | Westmoreland | 210/321 |
| 3,373,056 | 3/1968 | Martin | 117/144 |
| 3,432,584 | 3/1969 | Cannon et al. | 264/49 |
| 3,460,683 | 8/1969 | Cannon | 210/500 |
| 3,497,072 | 2/1970 | Cannon | 210/500 |
| 3,498,464 | 3/1970 | Frosolone | 210/457 |
| 3,504,796 | 4/1970 | Bray | 210/137 |
| 3,536,795 | 10/1970 | Burnette | 264/49 |
| 3,542,203 | 11/1970 | Hancock et al. | 210/321 |
| 3,554,378 | 1/1971 | Kohl | 210/321 |
| 3,585,126 | 6/1971 | Cannon | 210/321 |
| 3,640,390 | 2/1972 | Goy et al. | 210/130 |
| 3,666,109 | 5/1972 | Goeldner | 210/321 |
| 3,668,837 | 6/1972 | Gross | 255/158 |
| 3,675,776 | 7/1972 | Campo | 210/232 |
| 3,773,182 | 11/1973 | Jones | 210/321 |
| 3,813,334 | 5/1974 | Bray | 210/321 |
| 3,868,327 | 2/1975 | Van Gilder et al. | 264/41 |
| 3,872,014 | 3/1975 | Schell | 210/323 |
| 3,878,276 | 4/1975 | Hoernschemeyer | 210/457 |
| 3,912,630 | 10/1975 | Reighard et al. | 210/130 |
| 3,929,945 | 12/1975 | Thayer et al. | 264/41 |
| 3,933,646 | 1/1976 | Kanamaru et al. | 210/321 R |
| 3,977,967 | 8/1976 | Trulsen et al. | 210/23 F |
| 4,016,083 | 4/1977 | Sakaguchi et al. | 210/433.2 |
| 4,039,305 | 8/1977 | Livesay | 55/159 |
| 4,045,851 | 9/1977 | Ashare et al. | 29/157 R |
| 4,058,373 | 11/1977 | Kurz et al. | 55/16 |
| 4,061,576 | 12/1977 | Hilgert et al. | 210/437 |
| 4,074,985 | 2/1978 | Willas | 55/498 |
| 4,080,288 | 3/1978 | Pilson | 55/16 |
| 4,083,780 | 4/1978 | Call | 210/23 H |
| 4,105,562 | 8/1978 | Kaplan et al. | 210/232 |
| 4,130,403 | 12/1978 | Cooley et al. | 55/16 |
| 4,134,742 | 1/1979 | Schell | 55/16 |
| 4,158,629 | 6/1979 | Sawyer | 210/321.1 |
| 4,160,738 | 7/1979 | Guter | 210/232 |
| 4,177,031 | 12/1979 | Thayer et al. | 425/460 |
| 4,235,723 | 11/1980 | Bartlett, Jr. | 210/321 R |
| 4,238,207 | 12/1980 | Ruschke | 55/159 |
| 4,241,787 | 12/1980 | Price | 210/497.1 |
| 4,299,702 | 11/1981 | Bairindi et al. | 210/321.5 |
| 4,304,580 | 12/1981 | Gehl et al. | 55/482 |
| 4,330,306 | 5/1982 | Salant | 55/159 |
| 4,336,036 | 6/1982 | Lecke et al. | 55/159 |
| 4,358,377 | 11/1982 | Clark | 210/433.2 X |
| 4,442,003 | 4/1984 | Holt | 210/445 |
| 4,451,369 | 5/1984 | Sekino et al. | 210/321.1 |
| 4,478,719 | 10/1984 | Michele et al. | 210/641 |
| 4,495,072 | 1/1985 | Fields | 210/238 |
| 4,497,706 | 2/1985 | Pickett et al. | 210/130 |
| 4,517,085 | 5/1985 | Driscoll et al. | 210/232 |
| 4,517,720 | 5/1985 | Otstot et al. | 29/157 R |
| 4,548,714 | 10/1985 | Kirwan, Jr. et al. | 210/232 |
| 4,578,190 | 3/1986 | Fowler | 210/321.1 |
| 4,584,003 | 4/1986 | Oda et al. | 55/337 X |
| 4,610,787 | 9/1986 | Morgan et al. | 210/239 |
| 4,659,343 | 4/1987 | Kelly | 55/16 |

FOREIGN PATENT DOCUMENTS 1107659  8/1981  Canada ................ 210/321.87

OTHER PUBLICATIONS

Folio Title-Grace Membrane Systems.
Kremen, S. S. "Technology and Engineering . . . ", in *Reverse Osmosis and Synthetic Membranes*, S. Sourirajan Editor, NRCC No. 15627, 1977, pp. 371–385.
"Type 3003-B Roga Reverse Osmosis Membrane Module" Gulf General Atomic, Inc., San Diego, Calif., 6/1968.

*Primary Examiner*—Ernest G. Therkorn
*Attorney, Agent, or Firm*—David E. Heiser

[57] ABSTRACT

A fluid separation apparatus is described characterized in that it features novel means to package a spirally wound semi-permeable membrane filter within a standard steel pipe by the provision of a tubular liner/housing sealably supported within said steel pipe.

23 Claims, 2 Drawing Sheets

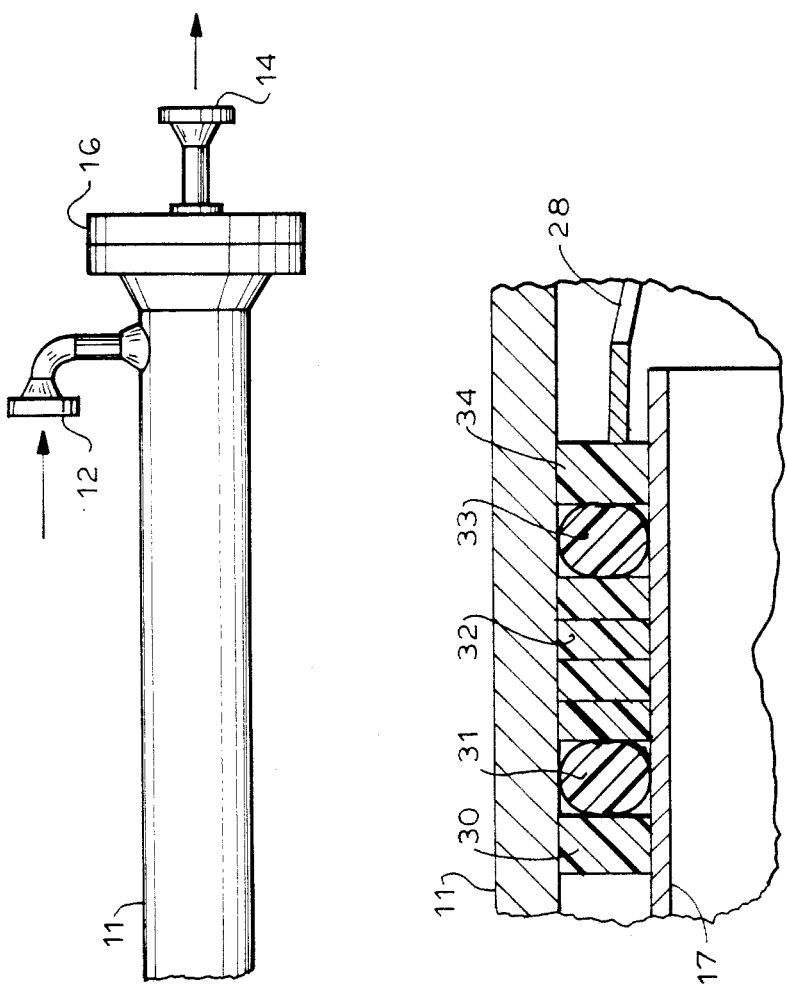
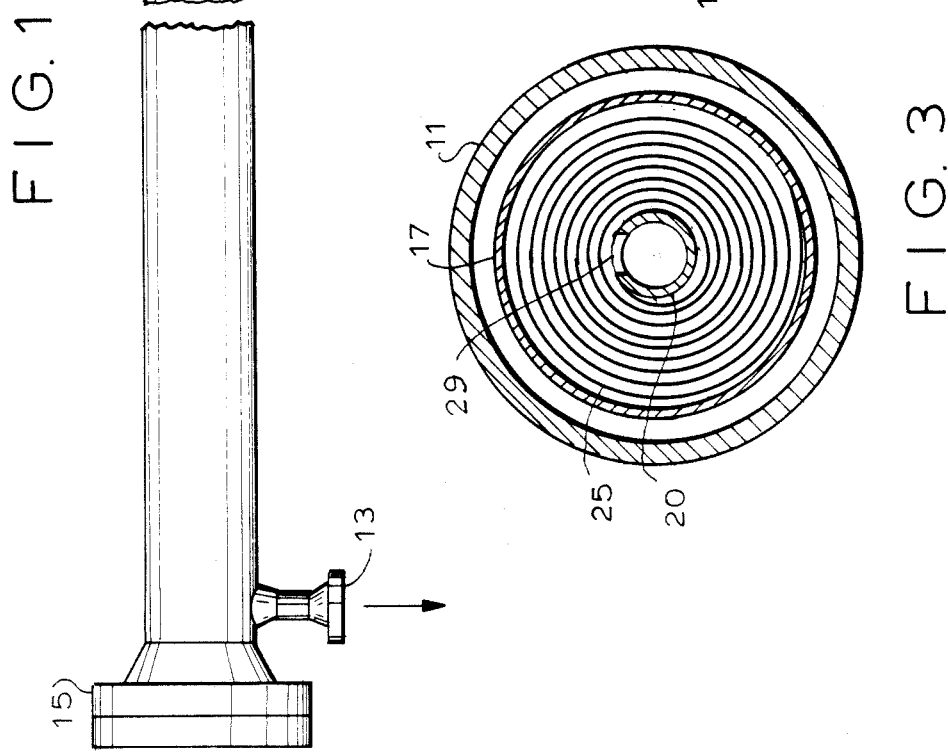
FIG. 1
FIG. 3
FIG. 4

FLUID SEPARATION MODULE

This invention relates to the construction of a module which can be used to contain a spiral wound membrane. More particularly this invention relates to a module for use in gas permeation processes.

Spiral wound arrangements have become commonly used in gas permeation, reverse osmosis and ultrafiltration applications for liquid and gas separation processes. An advantage of using a spiral wound technique is that this affords a large membrane contact area while permitting a rather small overall containment vessel. This is important since many types of separation techniques require rather high pressures. In many instances the pressures in such processes are in the range of about 500 p.s.i. to 3000 p.s.i.

In dealing with such pressures, besides having sufficient wall thickness, it is necessary to have good pressure seals. The various process streams which flow must remain separated. In membrane separation techniques there is an input stream, a membrane permeate stream and an output stream. The output stream contains the substances which did not pass through the membrane. The permeate stream contains the substances which passed through, permeated through, the membrane. Any intermingling of these streams decreases the efficiency of the process. These streams must be kept separated.

The usual way to use spiral wound membranes is to have them contained in modules. The modules can be used singly or interconnected in series or parallel arrangements. Each module will have an input stream, an output stream and a permeate stream. The permeate stream can be the desired product stream. However, in most gas permeation processes the permeate stream consists of contaminants which are removed from the input stream. In such instances, the output stream would be the desired product stream.

A preferred use for the present invention is in the removal of dissolved carbon dioxide, hydrogen sulfide and mercaptans from gaseous and liquid hydrocarbon streams. Various hydrocarbon streams will contain carbon dioxide and hydrogen sulfide. This is particularly the case for hydrocarbons being recovered from underground formations. Prior to use, the carbon dioxide, hydrogen sulfide and mercaptan contents must be reduced. Carbon dioxide lowers the heat value of a hydrocarbon fuel and dissolved hydrogen sulfide and mercaptans will produce air polution when the fuel is burned. In other uses of liquid hydrocarbon streams dissolved carbon dioxide, hydrogen sulfide and mercaptans must be significantly removed since these are unwanted acid forming contaminants.

Another use is in the removal of nitrogen from natural gas. In such a process, natural gas is fed to the module at a pressure of about 400 p.s.i. to 2000 p.s.i. Depending on the membrane being used either the hydrocarbon constituents or the nitrogen permeates through the membrane. The non-permeating component exits as the output stream. An efficient apparatus containing a number of modules interconnected in series can reduce the nitrogen content of a natural gas by more than 75 percent. Gas permeation technology can also be used in fine chemical processing. In the production of various chemical products various associated or dissolved gases must be reduced in content. These include air and its components such as nitrogen, carbon monoxide, carbon dioxide, nitrogen oxides, sulfur oxides and mercaptans. Gas permeation can also be used to remove gases from water, or even to separate different gases. This can all be accomplished at low energy requirements and fairly low capital cost through the use of gas permeation techniques.

A problem in using spiral wound membranes is that each module containing the membranes must be machined to close tolerances in order to assure good pressure seals. This results in an increased cost for each module. This problem is resolved by the present discovery through the use of a liner which contains the spiral wound membrane element. This liner is sealed within the module and also contains a conduit to pass the permeate stream to the outside of the module. The primary pressure seal which seals the liner to the module wall consists of an O ring-braided synthetic material—O ring arrangement. Metal rings are used at each end of the seal to maintain the integrity of the seal. In use, a contaminated hydrocarbon stream is flowed into the module containing the spiral wound membrane. The hydrocarbon stream flows between the membrane leaves and the dissolved carbon dioxide, hydrogen sulfide and mercaptans permeate through the membrane. The hydrocarbon stream exits the spiral wound membrane area near a mid-point of the structure, flows out openings in the liner, and exits the module. Permeated gas exits the module at a different opening.

BRIEF DESCRIPTION OF THE DRAWINGS

The invention will now be described in more detail with reference to the following drawings:

FIG. 1—is a side view of the membrane containing module.

FIG. 3—is a cross sectional view of the membrane assembly of FIG. 2.

FIG. 4—is a cross-sectional view of the gasket sealing means for the liner.

DESCRIPTION OF THE PREFERRED EMBODIMENTS

Figure 2:
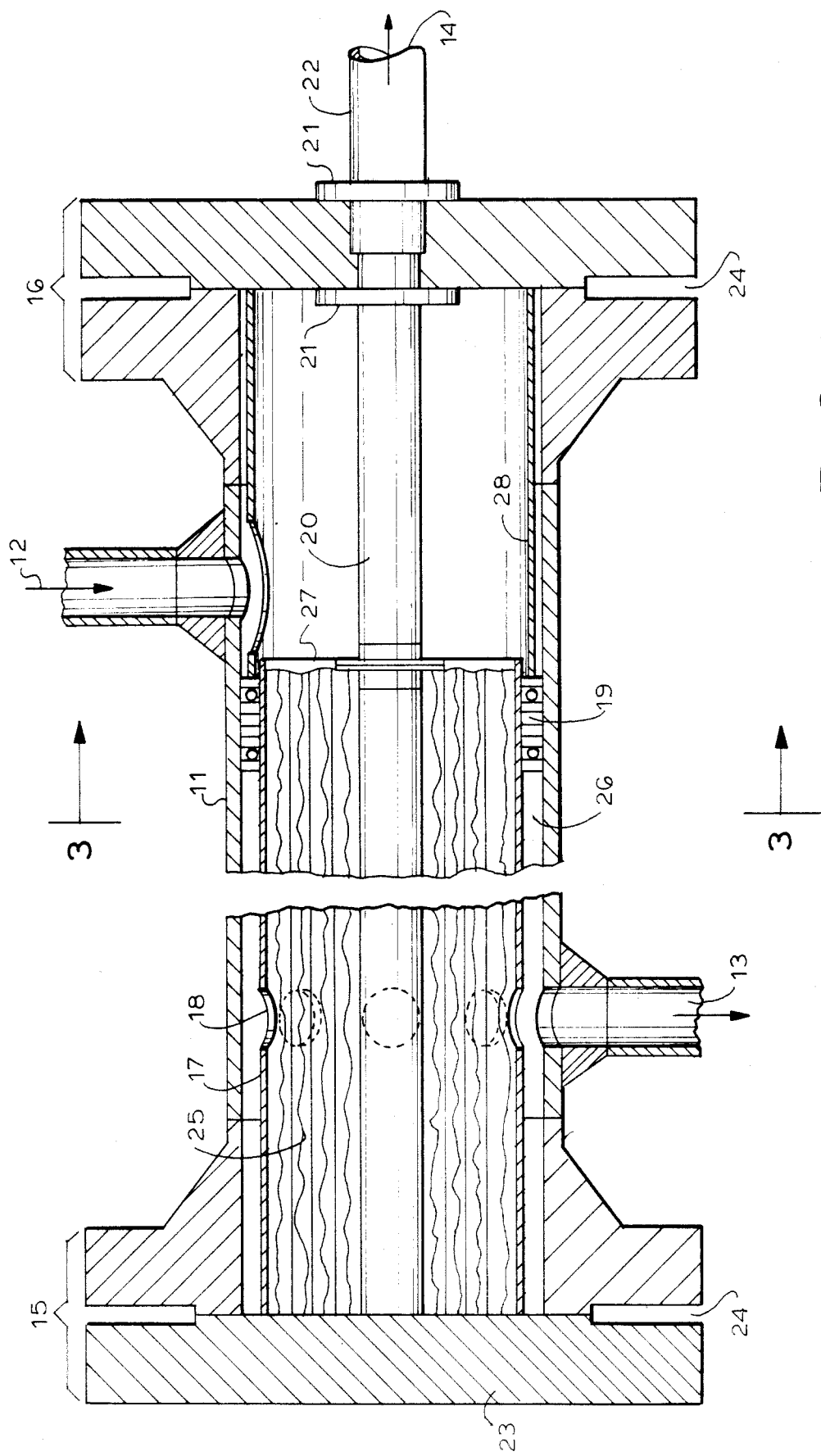
FIG. 2—is a longitudinal sectional view of the membrane containing module.

In more detail and with reference to FIG. 1 a module consists of containment vessel 11 which has a fluid inlet port 12, a fluid outlet port 13 and a permeate outlet port 14. Each end is closed to the atmosphere. In the present arrangement, there is shown a solid end cover 15 at one end and an end cover 16 which carries the permeate outlet port 14 at the other end. However, cover 15 can be of a construction similar to that of cover 16 with the result that permeate will exit the module at both ends. As shown in FIG. 1, the modules would be arranged for the permeate to flow in a single direction. The permeate from each module is collected in a header and then flowed to disposal or use.

FIG. 2 shows the internal structure of the module. Each end flange has a circular groove 24 for securing the modules to a supporting frame. Internally the module consists of the spiral wound membrane 25 which is contained in the liner insert 17. The fluid enters the spiral wound membrane in the area 27. The liner insert is machined to a smooth finish and contains a plurality of exit openings 18. These exit openings are in the region with the module outlet port 13. Only fluid which is passed in contact with the spiral wound membrane can pass through exit openings 18. This fluid collects in region 26 and then exits through exit port 13.

This region 26 is sealed from the input fluid by means of gasket structure 19. This gasket structure supports the liner insert as well as acting as a seal. Spacer 28 serves to maintain the gasket in place. The structure of this gasket will be described in more detail in FIG. 4. Optionally, there can be liner insert support spacers for the liner insert in the region adjacent to blank end 23. However, in use thus far these have not been found to be necessary.

Passing through the center of the module is permeate flow channel 20. This is metal tubing which either has a linear slit or contains a plurality of small openings to permit the flow of permeate into the tubing. Flanges 21 secure and seal this channel in end cover 16. Permeate flow channel extension 22 provides for the interconnection of the module to a collection system.

FIG. 3 shows the module in cross-section. This view shows the module wall 11, insert liner 17, spiral wound membrane 25 and the permeate flow channel 20. The substances which pass through the membrane travel to the end of the spiral wound membrane which communicate with the permeate flow channel via openings 29 in the permeate flow channel. Various known spacing structures such as Tricot products are used within the envelope to permit the flow of permeate through the envelope to the permeate flow channel. Such spacing structures consist of a fine mesh material with open channels to permit gas and liquid flow to the permeate flow channel. This material can be a polypropylene, ployester or similar polymeric material. There is also a spacing structure on the exterior surface of the membrane to permit the flow of the liquid into and through the spiral wound structure. This exterior surface spacer is made of a polymeric material such as polypropylene and has an open mesh of about 0.125 to 0.25 inch. Vexar netting is an example of such a product. Suitable spiral wound structures are shown in U.S. Pat. No. 4,134,742, and particularly in FIG. 3 of this patent.

The modules are constructed out of a high strength steel and can withstand pressure of up to 3000 p.s.i. The end covers are connected to a flange on the pipe portion of the module by a plurality of nuts and bolts. This standard arrangement is perferred since it permits access to the interior of the module for servicing the membrane and other parts. The containment vessel is approximately 25 feet in length and 10 inches in outer diameter. The liner insert is a fiberglass reinforced synthetic material, preferably a fiberglass or carbon fiber reinforced phenolic or polyester. Strength of the insert liner is not a factor since the pressure is essentially the same on each side. It is machined to fit within the containment vessel leaving a space of about 0.25 to 1 inch between the containment vessel walls and the insert liner. These inserts have an internal diameter of about 8 inches and a wall thickness of about 0.25 to 0.5 inches. They are easily machined to provide a uniform interior surface for providing a good seal between the module and the membrane.

FIG. 4 shows the structure of the gasket in more detail. This structure consists of metal retaining ring 30 which is welded to the wall of the containment vessel, O-ring 31, synthetic mesh 32, O-ring 33 and metal retaining ring 34. Spacer 28 provides a positive pressure on retaining ring 34 and thus aids the structural integrity of the gasket. This gasket keeps the input liquid from passing into contact with the output liquid stream and also supports the insert liner. Any commercially available O-ring that will seal the insert to the containment vessel can be used. The only consideration is that the O-rings be of a material which can withstand the substances with which it will come into contact. The synthetic mesh is preferably a Teflon or other polyflurocarbon material or a nylon. However, other materials not attacked by the environment can be used. The mesh in use has a thickness of about 0.25 to 1 inch and preferably about 0.5 inch and has a linear dimension along the insert liner of about 10 to 50 inches and preferably about 25 inches. A Teflon rope having a 0.5 inch diameter makes a useful mesh material.

The spiral wound membrane is a cellulose acetate membrane 42 inches in length and wound to an 8 inch diameter size. A module contains five sections of spiral wound membrane and is about 25 feet in length. Each spiral wound membrane section is about 36 inches in length. These sections are interconnected via the center permeate channel. After they are interconnected, the sections are inserted into the liner and end seals put in place. The end seals keep feed liquid or gas from passing between the liner surface and the membrane. It is desired to have maximum feed liquid or gas in contact with the membrane. In commercial use 3 to 10 modules are connected in series so that the outlet stream (not the permeate stream) from one module is the feed stream to the next module. In use, it is only the module wall, center permeate tube and membrane leaves which sense the full operating pressure. The linear insert and the seal only sense the pressure drop across the membrane sections which amounts to only a few p.s.i.

As an illustrative method of use, a hydrocarbon feed stream at 900 p.s.i. and containing 33% carbon dioxide and 2,600 grains of hydrogen sulfide is passed through a 6 module trailer mounted unit at the rate of 3 million cubic feet per day. A single pass through this unit reduces the carbon dioxide content to less than 3% and the hydrogen sulfide content to less than 200 grains. This is a significant drop in both carbon dioxide and hydrogen sulfide in a system not having any moving parts.

In operation, a gas or a liquid, such as a hydrocarbon stream which contains dissolved carbon dioxide and hydrogen sulfide is flowed into the module at a pressure of about 1000 p.s.i.

The primary feature of this invention is the use of liner inserts to contain the spiral wound membrane. This decreases the cost since the containment vessel interior wall does not require fine machining. It also permits the assembly of a number of liner inserts containing the spiral wound membrane for quick repair of the system. It is also easier to remove and insert spiral wound membrane units since they easily slide out of and into the liner insert. This also allows the liner insert and gasket seal to remain in place during servicing resulting in a considerably shortened time required for replacing membrane units.

This arrangement for a spiral wound membrane has other advantages. However, these are within the scope of the present invention.

What is claimed is:

1. An improved spiral wound membrane filter apparatus comprising a containment vessel having an inlet and an outlet for a feed stream and an outlet for a permeate stream and further comprising a spiral wound membrane having a permeate conduit which communicates with said permeate outlet within said containment vessel, the improvement comprising a cylindrical liner insert having a smoothly finished interior surface in which said spiral wound membrane is removably contained in sealed relation to said smooth surface, said cylindrical liner insert being offset from the wall of said containment vessel and supported within said containment vessel by a gasket such that the spiral wound membrane may be removed while the liner insert and gasket remain in place within the containment vessel.

2. An improved spiral wound membrane filter apparatus as in claim 1 wherein said gasket is structurally comprised of a synthetic material positioned between two O-rings such that the liner is sealed to the containment vessel wall.

3. An improved spiral wound filter apparatus as in claim 2 wherein a first metal retaining ring is positioned between the liner insert and the containment vessel wall and is welded to said wall; wherein a second metal retaining ring is positioned between the liner insert and the containment vessel wall; wherein the O-rings are positioned between said first and second metal retaining rings, with one of said metal retaining rings being adjacent to each O-ring; and wherein a spacer is provided to provide positive pressure on said second metal retaining ring, thereby enhancing the integrity of the gasket seal.

4. An improved spiral wound membrane filter apparatus as in claim 2 wherein said synthetic material is a mesh of polymeric material selected from the group consisting of polyflurocarbon polymers and nylon polymers.

5. An improved spiral wound membrane filter apparatus as in claim 2 wherein said liner insert is offset from the containment vessel wall by a distance of from about 0.25 to 1 inch.

6. An improved spiral wound membrane filter apparatus as in claim 2 wherein said liner insert is comprised of a fiber reinforced polymeric material.

7. An improved spiral wound membrane gas separation apparatus having a containment vessel with a feed stream inlet for passing a feed stream gas into the containment vessel, a feed stream outlet for passing out of the containment vessel a portion of the feed steam gas after it has contacted a membrane without permeating therethrough, and a permeate stream outlet for passing out of the containment vessel a portion of the feed stream gas after it has contacted the membrane and permeated therethrough, and adapted for employing during operation a spiral wound membrane with a permeate flow channel which is in communication within the containment vessel with the permeate stream outlet such that gas which has permeated through the membrane passes through the permeate flow channel to the permeate outlet, the improvement comprising:

(a) a liner insert fitted within the containment vessel and fitted with a spiral wound membrane which can be selectively inserted for operation within the apparatus and removed therefrom by sliding it into and out of the liner insert, said liner insert having a uniform interior surface adapted to seal the spiral wound membrane within the liner insert when the spiral wound membrane is inserted for operation; and (b) a seal which seals the liner insert within the containment vessel, such that when the apparatus is operated with the membrane inserted and sealed within the liner, the gas from the feed stream which exits through the containment vessel feed stream outlet is gas which has passed into contact with the spiral wound membrane.

8. The improved spiral wound membrane separation apparatus of claim 7 wherein the liner insert is tubular with a cylindrical interior surface.

9. The improved spiral wound membrane separation apparatus of claim 8 wherein the liner insert is a fiberglass reinforced synthetic material.

10. The improved spiral wound membrane separation apparatus of claim 9 wherein the liner insert has a wall thickness of about 0.25 to 0.5 inches.

11. The improved spiral wound membrane separation apparatus of claim 10 wherein the interior surface of the liner insert has a diameter of about 8 inches.

12. The improved spiral wound membrane separation apparatus of claim 10 wherein the liner insert is fiberglass reinforced polyester.

13. The improved spiral wound membrane separation apparatus of claim 7 further comprising an end seal which is adapted to keep fluid from flowing between the liner surface and the spiral wound membrane when said membrane is inserted for operation.

14. The improved spiral wound membrane separation apparatus of claim 7 wherein the containment vessel comprises standard steel pipe.

15. The improved spiral wound membrane separation apparatus of claim 7 wherein the liner insert is fiberglass or carbon fiber reinforced phenolic.

16. The improved spiral wound membrane separation apparatus of claim 7 wherein the liner insert is fiberglass or carbon fiber reinforced polyester.

17. The improved spiral wound membrane separation apparatus of claim 7 wherein the liner insert is supported within the containment vessel such that it is spaced from the walls of the containment vessel.

18. The improved spiral wound membrane separation apparatus of claim 7 wherein the seal (b) comprises a gasket.

19. The improved spiral wound membrane separation apparatus of claim 18 wherein the gasket supports the liner insert within the containment vessel such that the liner insert is spaced from the containment vessel walls.

20. The improved spiral wound membrane separation apparatus of claim 19 wherein the containment vessel is high strength steel that can withstand pressure of up to 3000 psi.

21. The improved spiral wound membrane separation apparatus of claim 18 wherein the gasket comprises a synthetic material positioned between two O-rings; and wherein a first metal retaining ring is positioned between the liner insert and the containment vessel wall and is welded to said wall; wherein a second metal retaining ring is positioned between the liner insert and the containment vessel wall; wherein the O-rings are positioned between said first and second metal retaining rings, with one of said metal retaining rings being adjacent to each O-ring; and wherein a spacer is provided to provide positive pressure on said second metal retaining ring, thereby enhancing the integrity of the gasket seal.

22. The improved spiral wound membrane separation apparatus of claim 7 wherein permeate channels of the liner insert are adapted for insertion of sections of spiral wound membrane which are interconnected via their permeate flow channels.

23. The improved spiral wound membrane separation apparatus of claim 22 further comprising end seals which are adapted to keep fluid from flowing between the liner surface and the membrane when the sections are inserted.

* * * * *